(12) United States Patent
Trimmer et al.

(10) Patent No.: US 7,069,466 B2
(45) Date of Patent: Jun. 27, 2006

(54) METHOD AND SYSTEM FOR COPYING BACKUP DATA

(75) Inventors: Don Alvin Trimmer, Livermore, CA (US); Roger Keith Stager, Livermore, CA (US); Craig Anthony Johnston, Livermore, CA (US); Rico Blaser, San Francisco, CA (US)

(73) Assignee: Alacritus, Inc., Pleasanton, CA (US)

( * ) Notice: Subject to any disclaimer, the term of this patent is extended or adjusted under 35 U.S.C. 154(b) by 384 days.

(21) Appl. No.: 10/218,249

(22) Filed: Aug. 14, 2002

(65) Prior Publication Data

US 2004/0034811 A1  Feb. 19, 2004

(51) Int. Cl.
G06F 11/00 (2006.01)
(52) U.S. Cl. .............................. 714/6; 714/13; 711/162
(58) Field of Classification Search .................... 714/6, 714/13; 711/162, 111, 161
See application file for complete search history.

(56) References Cited

U.S. PATENT DOCUMENTS

| | | | |
|---|---|---|---|
| 4,775,969 A | 10/1988 | Osterlund | |
| 5,438,674 A | 8/1995 | Keele et al. | |
| 5,455,926 A | 10/1995 | Keele et al. | |
| 5,666,538 A | 9/1997 | DeNicola | |
| 5,774,292 A | 6/1998 | Georgiou et al. | |
| 5,805,864 A | 9/1998 | Carlson et al. | |
| 5,809,511 A | 9/1998 | Peake | |
| 5,854,720 A | 12/1998 | Shrinkle et al. | |
| 5,911,779 A | 6/1999 | Stallmo et al. | |
| 5,961,613 A | 10/1999 | DeNicola | |
| 5,963,971 A | 10/1999 | Fosler et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A * | 5/2000 | Gallo et al. ................... | 714/13 |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,173,359 B1 | 1/2001 | Carlson et al. | |
| 6,195,730 B1 | 2/2001 | West | |
| 6,247,096 B1 | 6/2001 | Fisher et al. | |
| 6,260,110 B1 | 7/2001 | LeCrone et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,304,880 B1 | 10/2001 | Kishi | |
| 6,317,814 B1 * | 11/2001 | Blendermann et al. ..... | 711/162 |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 * | 1/2002 | Day et al. ................... | 711/161 |
| 6,339,778 B1 | 1/2002 | Kishi | |
| 6,341,329 B1 | 1/2002 | LeCrone et al. | |
| 6,343,342 B1 | 1/2002 | Carlson | |

(Continued)

Primary Examiner—Robert Beausoliel
Assistant Examiner—Yolanda L. Wilson
(74) Attorney, Agent, or Firm—Volpe and Koenig, P.C.

(57) ABSTRACT

A method and system for copying backup data is disclosed. Backup data may be copied to a first virtual tape library in the same format as it would be copied to a physical tape library. The backup data may also be electronically copied to a second virtual tape library or to a physical tape library.

22 Claims, 2 Drawing Sheets

U.S. PATENT DOCUMENTS

| | | |
|---|---|---|
| 6,353,837 B1 | 3/2002 | Blumenau |
| 6,360,232 B1 | 3/2002 | Brewer et al. |
| 6,389,503 B1 | 5/2002 | Georgis et al. |
| 6,408,359 B1 | 6/2002 | Ito et al. |
| 6,487,561 B1 | 11/2002 | Ofek et al. |
| 6,557,089 B1 * | 4/2003 | Reed et al. ................ 711/162 |
| 6,779,058 B1 * | 8/2004 | Kishi et al. ................... 710/60 |
| 6,779,081 B1 | 8/2004 | Arakawa et al. |
| 6,816,941 B1 * | 11/2004 | Carlson et al. ............. 711/111 |
| 2002/0166079 A1 | 11/2002 | Ulrich et al. |
| 2003/0004980 A1 * | 1/2003 | Kishi et al ................... 707/204 |
| 2003/0037211 A1 * | 2/2003 | Winokur ...................... 711/162 |
| 2003/0120676 A1 * | 6/2003 | Holavanahalli et al. ..... 707/102 |

\* cited by examiner

METHOD AND SYSTEM FOR COPYING BACKUP DATA

BACKGROUND

The present invention relates to data protection and more particularly to the management and storage of backup data.

Data protection (which includes backing up computer data, restoring computer data, securing computer data, and managing computer data storage) and disaster recovery procedures are essential processes to organizations that use computers. In fact, data protection is the single most expensive storage administrative task. Most large organizations perform data backups to tape media and use a robotically-controlled tape library or tape jukebox to assist with backup automation. Performing and managing backups and restores involves many functions including, for example, media management (including tape tracking, rotation and off-site storage), tape jukebox management, file tracking, backup scheduling, assisted or automated data restore and data archival.

In order to effectively perform the above functions, a sophisticated data protection application (DPA) is required. Examples of such DPAs include, for example, Legato Net-Worker, Veritas BackupExec and CA ArcServe. DPAs automate and assist with the essential functions of data protection. DPAs are designed specifically to work with physical tape media, tape drives and tape libraries. Most of the complexity in DPAs relates to their interaction with physical tape.

An important procedural requirement of data protection programs is to physically move tapes after backups have been completed to an offsite location. The tapes are stored in the offsite location so that they may be retrieved in case of a major onsite disaster. Physically transporting tapes offsite is cumbersome, labor intensive and expensive. Furthermore, shipping the only copy of backup tapes offsite means that each time minor restores need to be performed, the backup tape must be shipped back onsite. This is particularly problematic because the most likely tape that will be required for minor restores is the latest backup tape, which at many sites, is moved offsite as early as the same day the backup for that day is completed.

To alleviate the problems associated with shipping backup tapes offsite, it is possible for a DPA to make a copy of a physical tape so that there is one copy that can stay onsite and one copy that can be stored offsite. This process, however, is cumbersome and very CPU intensive and typically involves duplicating the tape and its file index information. Furthermore, because of the inherent shortcomings of tape media, it is nearly impossible to duplicate tapes without using a DPA.

It is therefore desirable to provide a method and system wherein backup data can be electronically copied to a storage medium which may be located offsite while still being available onsite to perform restore functions, potentially even without using a DPA.

SUMMARY

The invention is a method and system for copying backup data to a first virtual tape library (VTL) and to a second VTL or physical tape library (PTL). Backup data that is copied to the first VTL may be electronically copied or otherwise transmitted to the second VTL or to the PTL.

BRIEF DESCRIPTION OF THE DRAWING(S)

DETAILED DESCRIPTION OF THE PREFERRED EMBODIMENT(S)

Figure 1:
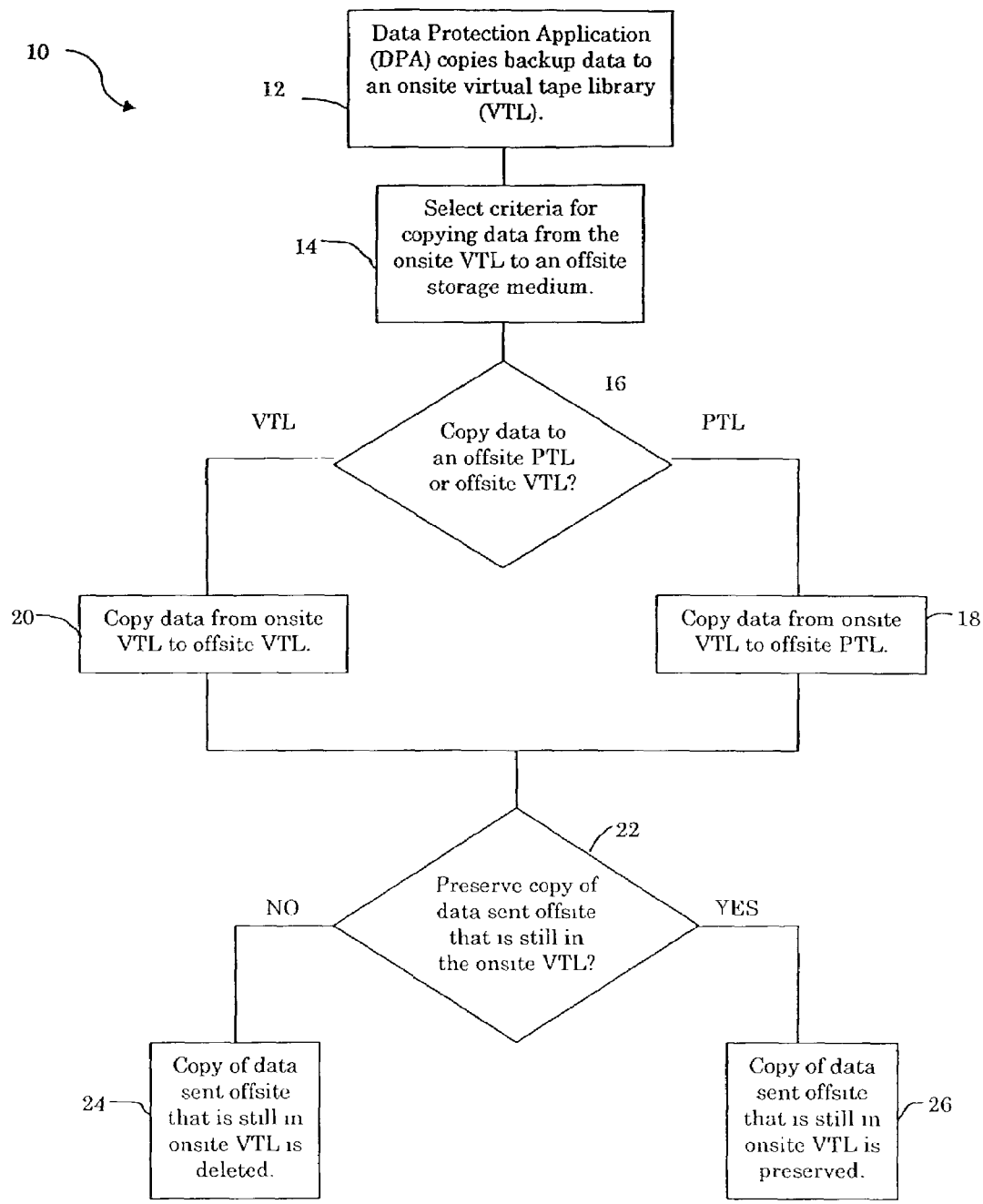
FIG. 1 is a diagram showing a method for copying backup data in accordance with the preferred embodiment of the invention.

Referring now to FIG. 1, a method 10 for electronically copying backup data is shown. For sake of clarity, backup data, for purposes of describing the preferred embodiments, is any data that has been backed-up from any type of computer network or application. The method 10 starts by copying backup data to an onsite virtual tape library (VTL) (step 12). The backup data is preferably copied to the onsite VTL using a DPA.

In general, a VTL, either onsite or offsite, is a disk based repository for backup data. The VTL is a logical representation of a PTL. It exhibits all the behaviors of a PTL—it appears to have a robotic arm, one or more tape drives, tape cartridge slots, mailbox (entry/exit) slots and a bar code reader. It can respond on the bus (SCSI or FC) in exactly the same way as a PTL. Furthermore, the characteristics of a VTL are defined by virtual library types. A VTL type defines how many tape drives and tape slots the library should have, as well as how the library should identify itself when probed on the bus.

Similar to the virtual tape library, a virtual tape is a logical representation of a physical tape. Virtual tapes are used inside virtual libraries and written to by virtual tape drives in the same way as physical tapes. When a virtual tape is created, a tape label is associated with it. This label is used to identify a particular virtual tape which in turn comprises particular virtual tape files. Tape labels in a VTL are reported to the DPA in exactly the same way as tape barcode labels are reported by a PTL. Copying the contents of a VTL is just as critical as copying the contents of a PTL when dealing with site failures. However, copying the contents of a VTL does not require a DPA and is much easier and more flexible. Furthermore, the disk based VTL is more reliable than tape media and a PTL.

When copying the data to the onsite VTL, the DPA writes the data to the onsite VTL in exactly the same format as if the DPA was writing the data to tape. While the DPA is writing data to the onsite VTL, a log is kept of all the write operations made by the DPA to the onsite VTL. Maintaining the log of write operations allows the particular sequence in which the data was copied to the onsite VTL to be played back in the same way it was received from the DPA. This allows additional physical tapes to be conveniently created without using the DPA which are equivalent to a physical tape created using a DPA.

The data contained in the onsite VTL may be electronically copied or otherwise transmitted to an offsite VTL or offsite PTL so that an offsite copy of the data exists in addition to the onsite copy. The data may be copied using any type of electronic transmission wherein both sides can establish an authenticated connection and both sides agree on the sequence and format in which data will be sent (i.e. one virtual tape at a time; in order of block sequence number; metadata first). Examples of possible electronic transmission methods are the internet, intranet, direct link, a fibre channel storage area network, SCSI or ATA connection or any type of computer network and any type of wireless communication system.

More specifically, some configurations allow copying data from the onsite VTL to the offsite PTL/VTL, using the internet protocol (IP) by tunneling fibre channel commands through IP traffic. Other configurations allow for an encrypted channel for security reasons. A propriety protocol may also be desirable.

Where the data is being copied or otherwise electronically transmitted offsite, there are a few additional methods available when copying data from the onsite VTL to the offsite VTL that may not be available when copying data from the onsite VTL to the offsite PTL. This is because the PTL only interoperates with certain standard interfaces (such as fibre channel) and therefore cannot take advantage of protocols as iSCSI that may only be implemented by a VTL when copying data from the onsite VTL to the offsite location. Additionally, in a VTL, the copy may be accomplished by simply copying disks. As mentioned above, however, the described methods for copying or otherwise electronically transmitting backup data are exemplary as any method may be used wherein both sides can establish an authenticated connection and both sides agree on the sequence and format in which data will be sent.

In step 14, a criteria for copying the data offsite from the onsite library is selected. The criteria specifying how data is to be copied for offsite storage is a function of personal preference as well as organizational policy. By way of example, specific virtual tapes may be selected for copying or a policy may be established whereby all virtual tapes that fit the criteria of the policy are copied. An example of a particular policy for copying data may be that all tapes are copied on a daily basis. The virtual tape library may also be set up to copy all the data within the onsite VTL or particular virtual tape files contained within virtual tapes contained with the onsite VTL. Further examples include copying specific sets of tapes or tape files as well as copying data contained within the onsite VTL at predetermined intervals of time.

Regardless of the criteria for copying data offsite, the destination of the copied data is selected in step 16. The selected destination is an offsite storage medium which may be an offsite VTL or an offsite PTL, as desired. If the selected destination is a PTL, the data selected for copying is copied from the onsite VTL to an offsite PTL (step 18). If the selected destination is an offsite VTL, the data selected for copying is copied from the onsite VTL to the offsite VTL (step 20). As described above, copying data to a VTL may provide additional configuration options.

Once the data has been copied from the onsite VTL to the selected destination, the copy of the selected data that is still in the onsite VTL may be preserved or deleted, as desired (steps 22–26).

Figure 2:
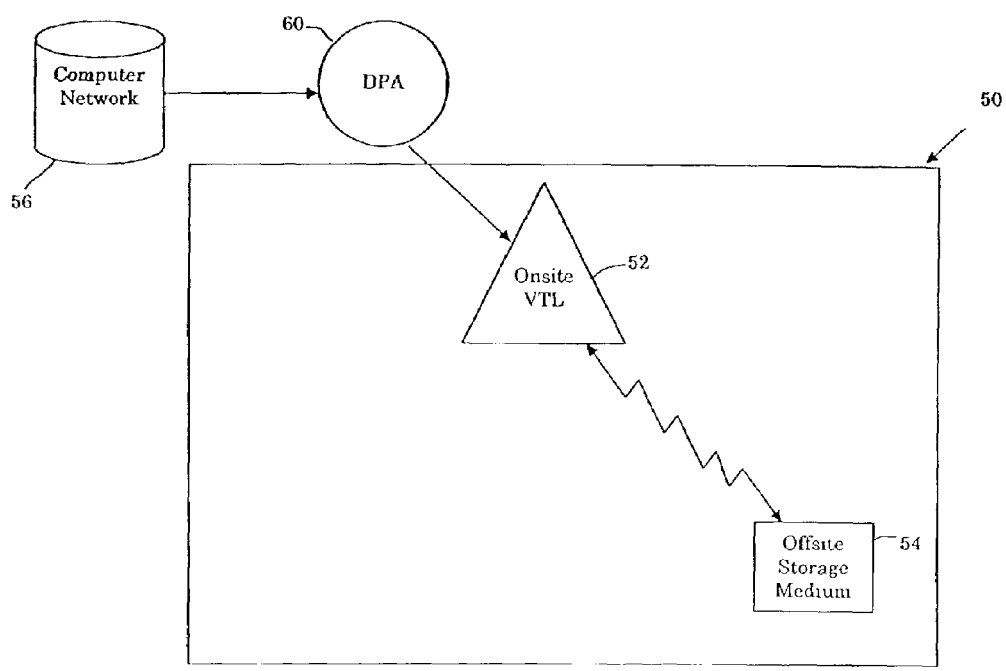
FIG. 2 is a system whereby backup data may be copied in accordance with the preferred embodiment of the invention.

Referring now to FIG. 2, there is shown a system 50. The system 50 comprises an onsite VTL 52 and an offsite storage medium 54. Data originating in a computer network 56 is backed up to the onsite VTL 52, preferably using a DPA. The DPA writes the data to the onsite VTL in exactly the same format as if the DPA was writing the data to tape. While the DPA is writing the data to the onsite VTL 52, a log is keep of all the write operations performed by the DPA, as explained above.

The data may then be copied or otherwise transmitted to an offsite storage medium 54 such as an offsite VTL or an offsite PTL thereby providing an onsite mechanism for creating a physical tape without using the cumbersome process of having the DPA 60 write the tape. That is, now that an exact copy of how the DPA would write to a tape is stored in the onsite VTL, that copy may simply be played back in the event a restore needs to be performed that does not warrant physically retrieving offsite data. In the event of a major onsite disaster where offsite data is required to fully restore an onsite network, the offsite data may be retrieved and copied back into the onsite computer network, as desired.

It is important to note that even though in the preferred embodiments there is an onsite VTL and an offsite VTL, it is of course possible to copy data between any two VTLs, even if they are in the same physical location (i.e. data may be copied between first and second VTLs regardless of their location). This may be desirable for restore performance reasons or otherwise. The same is also true for backup data copied between a VTL and a PTL; the actual physical location of either library may be anywhere. That is, the offsite PTL, just like the offsite VTL, does not have to be offsite, but may be located anywhere. In addition, any type of data could be stored on physical and virtual tapes contained in the physical and virtual libraries described above—not just backup data. That is, the present invention is not limited to just copying backup data as defined in paragraph 15 which was so defined for purposes of describing the preferred embodiments, but rather may be any type of data. For example, an alternate embodiment of the invention is to copy multimedia data in the same fashion as described above.

It is also important to note that the second VTL, whether onsite or offsite, does not necessarily know whether it is receiving data from the first VTL or directly from the DPA. Therefore, for example, data may be sent directly from the DPA to the second VTL. This may be particularly useful where the first VTL is not operating or where copying from the DPA to a VTL other than the first VTL is simply more convenient.

Although the present invention has been described in detail, it is to be understood that the invention is not limited thereto, and that various changes can be made therein without departing from the spirit and scope of the invention, which is defined by the attached claims.

What is claimed is:

1. A method for copying backup data comprising:
   copying backup data from a data protection application to an on-site virtual tape library wherein the data protection application writes to the virtual tape library as if it were writing to a physical tape library;
   wherein a log is kept of all the write operations made while the data is copied to the on-site virtual tape library in order to create additional copies without the use of the data protection application; and
   electronically transmitting the data from the on-site virtual tape library to an off-site storage medium, wherein a restore operation may be performed using the data transmitted to the off-site storage medium.

2. method of claim 1 wherein the data is transmitted from the on-site virtual tape library to the off-site storage medium using an authenticated connection.

3. method of claim 2 wherein the on-site virtual tape library and off-site storage medium use a predetermined sequence and format for transmitting the data.

4. The method of claim 1 wherein the on-site virtual tape library is a disk based repository for backup data that serves to backup data in the same manner as a physical tape library.

5. method of claim 1 wherein the data is transmitted from the on-site virtual tape library to the off-site storage medium over a computer network.

6. The method of claim 1 wherein the data is transmitted from the on-site virtual tape library to the off-site storage medium over the internet.

7. The method of claim 1 wherein the data is transmitted from the on-site virtual tape library to the off-site storage medium over an intranet.

8. The method of claim 1 wherein the data is transmitted from the on-site virtual tape library to the off-site storage medium over a direct link between the on-site virtual tape library and the off-site storage medium.

9. The method of claim 1 wherein the data is transmitted from the on-site virtual tape library to the off-site storage medium over a wireless communication system.

10. The method of claim 1 wherein the off-site storage medium is a virtual tape library.

11. The method of claim 1 wherein the off-site storage medium is a physical tape library.

12. The method of claim 1 wherein the data on the on-site virtual tape library is preserved after the data is sent to the off-site storage medium.

13. The method of claim 1 wherein the data on the on-site virtual tape library is deleted after the data is sent to the off-site storage medium.

14. The method of claim 1 wherein the data is multimedia data.

15. A method for copying backup data comprising:
 copying backup data from a data protection application to an on-site virtual tape library wherein the data protection application writes to the virtual tape library as if it were writing to a physical tape library;
 selecting a criteria for transmitting data from the on-site virtual tape library to an off-site virtual tape library;
 wherein a log is kept of all the write operations made while the data is copied to the on-site virtual tape library in order to create additional copies without the use of the data protection application and
 electronically transmitting the data from the on-site virtual tape library to the off-site virtual tape library according to the selected criteria, wherein a restore operation may be performed using the data transmitted to the off-site virtual tape library.

16. The method of claim 15 wherein the off-site virtual tape library is a physical tape library.

17. The method of claim 15 wherein the data in the on-site virtual tape library is deleted after being sent to the off-site virtual tape library.

18. The method of claim 15 wherein the data is multimedia data.

19. A system for copying backup data comprising:
 an on-site virtual tape library for storing backup data wherein a data protection application copies the data to the on-site virtual tape library as if the data protection application was copying the data to a physical tape library;
 wherein a log is kept of all the write operations made while the data is copied to the on-site virtual tape library in order to create additional copies without the use of the data protection application;
 means for electronically transmitting the data from the on-site virtual tape library to an off-site storage medium;
 the off-site storage medium being selected from the group of;
  a virtual tape library; and
  a physical tape library; and
 wherein a restore operation may be performed using the data transmitted to the off-site storage medium.

20. A system as in claim 19 wherein a physical tape can be created by playing back data copied to the on-site virtual tape library.

21. A system as in claim 19 wherein the data is multimedia data.

22. A system as in claim 19 wherein a physical tape can be created by playing back data transmitted to the off-site virtual tape library.

\* \* \* \* \*